March 2, 1971  W. W. MARTENY ET AL  3,567,537
POWDERED THERMOPLASTIC BAG SEALING PROCESS
Filed July 31, 1967
FIG. 1
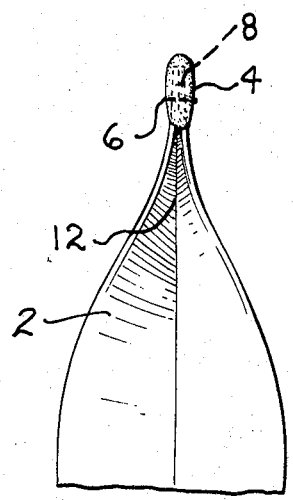
FIG. 2
FIG. 3
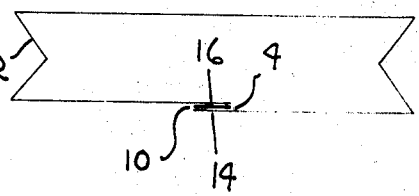
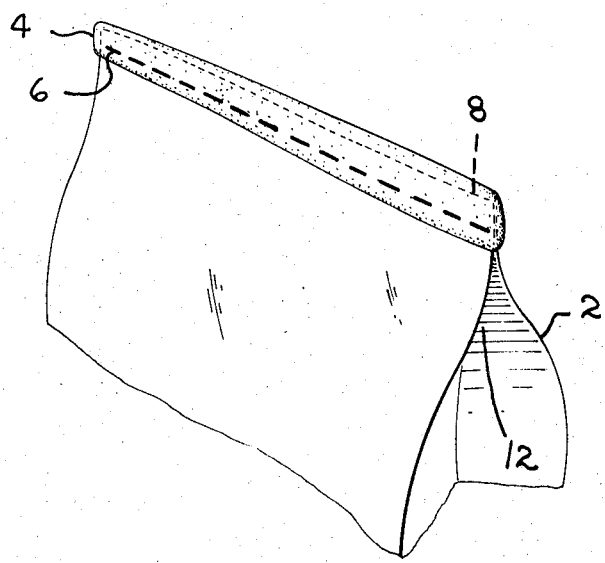
INVENTORS
WILLIAM W. MARTENY
CHARLES P. SPRING
BY Donald R. Bahr
W. A. Schaich
ATTORNEYS

3,567,537
POWDERED THERMOPLASTIC BAG SEALING PROCESS

William W. Martney, Toledo, and Charles P. Spring, Sylvania, Ohio, assignors to Owens-Illinois, Inc.
Filed July 31, 1967, Ser. No. 657,378
Int. Cl. B32b 7/08
U.S. Cl. 156—91                              4 Claims

ABSTRACT OF THE DISCLOSURE

This invention is concerned with a bag sealing method wherein a thermoplastic powder is utilized to hermetically seal the sewn end of a bag including the gussets. The seal is effected by the application of heat and pressure to the thermoplastic powder coated areas. The application of heat and pressure causes some of the thermoplastic material to migrate into and through the sewn portion so as to produce a durable hermetic seal.

---

This invention relates to a method for sealing bag-like containers. More specifically, this invention is concerned with a process for sealing bag-like containers by the utilization of a thermoplastic powder which is heat-sealed over the end portion, gusset portion and sewn portion of a bag.

Bags which are formed from various flexible materials such as paper, plastic, etc. are widely used as shipping containers for diverse bulk materials, such as cement, sand, fertilizer, peat moss, chemicals, etc. In shipping these materials, it is often desirable to hermetically seal the bag in question against the entry of air and moisture. To effect a hermetic seal on the bag in question is particularly desirable wherein the bags are to be utilized for the shipment of goods which are hygroscopic or which are detrimentally affected by air. In the past, it has been common practice to effect the closure of bags by sewing the ends. While this method of effecting a closure on bags is extremely desirable in that a strong mechanical bond is formed, it is undesirable in that a hermetic seal is not formed. Accordingly, goods which are being shipped in the bags in question can be detrimentally affected by air and moisture entering through the needle holes. In accordance with the subject invention, these disadvantages of the prior art are overcome.

The utilization of other sealing means, such as adhesive and tape in combination with sewing, is known in the prior art for sealing bags and bag-like containers. As is stated above, these prior art combinations do not hermetically seal the bags or bag-like containers in question. This invention utilizes a thermoplastic powder to effect a seal on the sewn or unsewn bags. By the application of heat and pressure to the thermoplastic powder as utilized in accordance with this invention, small amounts of thermoplastic material are caused to migrate into and through the apertures which result from sewing. Due to this fact, these apertures are fully sealed; thereby a hermetic seal results.

The subject invention is illustrated on the attached drawings, on which:

FIG. 1 is a fragmentary cross-sectional view of one end portion of a bag which has been sealed in accordance with this invention.

FIG. 2 is a fragmentary perspective view illustrating the sealing technique of this invention.

FIG. 3 is a fragmentary perspective view showing the sealing technique of this invention as used to seal an overlapping longitudinal bag seam.

The primary object of this invention is a superior bag-sealing technique.

Another object of this invention is a process for sealing bags with a powdered thermoplastic material.

Still another object of this invention is the bags which are sealed in accordance with this invention.

Finally, the objects of this invention include all the other novel features which will be obvious from the specification and claims at hand.

Referring to FIG. 1, a bag 2 which can be formed from any suitable flexible material, such as paper, plastic, etc., has an upper extremity terminating in a mouth portion 8. Mouth portion 8 is often mechanically bonded by means of sewing, which forms a stitched seam 6.

Both the mouth portion 8, gusset 12, and the stitching seam 6 of bag 2 are hermetically sealed in accordance with this invention by the utilization of a thermoplastic powder seam 4.

FIG. 2 illustrates an intermediate stage in the sealing of mouth portion 8 and gusset 12 of bag 2. This figure illustrates a thermoplastic powder seam 4 after it has been applied but before heat and pressure are applied to secure the mouth portion 8 and stitching seam 6.

FIG. 3 illustrates another embodiment of this invention wherein body joints or seams on bags and bag-like closures can be secured in accordance with this invention. In FIG. 3 an overlapping seam 10 on a bag 2 is secured with a longitudinal powdered thermoplastic seam 4. Powdered thermoplastic seam 4 is positioned between overlap portions 14 and 16 of bag 2.

Powdered thermoplastic seam 4 can comprise any suitable thermoplastic material or mixture of thermoplastic materials.

Examples of thermoplastics which are suited for use in this phase of the subject invention include both homopolymeric and copolymeric resins, such as (1) vinyl resins formed by the polymerization of vinyl halides or by the copolymerization of vinyl halides with unsaturated polymerizable compounds, e.g., vinyl esters, $\alpha,\beta$-unsaturated esters, $\alpha,\beta$-unsaturated ketones, $\alpha,\beta$-unsaturated aldehydes, and unsaturated hydrocarbons, such as butadienes and styrenes; (2) poly-$\alpha$-olefins, such as polyethylene, polypropylene, polybutylene, polyisoprene and the like, including copolymers of poly-$\alpha$-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including copolymers and terpolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) silicones such as dimethyl and methyl hydrogen polysiloxanes; (14) unsaturated polyesters; (15) cellulose esters including the nitrate, acetate, propionate, (16) waxes such as paraffin and microcrystalline; and (17) bituminous materials, etc. This list is not meant to be limiting or exhaustice, but merely to illustrate the wide range of polymeric materials which may be employed in the present invention.

Preferred thermoplastic polymers adapted for use in the formation of seam 4 are those derived from olefinic hydrocarbons having from one to 12 carbon atoms, homopolymers and copolymers of ethylene, propylene, 1-butene, nylon, styrene, vinyl chloride, butadiene, and isoprene. However, the thermoplastic material can be low density or high density, low molecular weight or high molecular weight, and low melting or high melting, within the physical and chemical property limits of such materials. Mixtures of the above-described polymers can also be used.

Powdered thermoplastic materials for use in forming seam 4 can be applied by any convenient means. The area to be coated should be positioned such that the applied particles will not be subject to removal by gravitational force prior to sealing. The particles are preferably applied by mechanical means such as dusting or brushing.

Likewise, the area to be particle-coated can be pre-coated with a liquid which will cause the particles utilized to adhere to said liquid and thus the bag surfaces. The only qualification for this mode of application is that the liquid must be compatible with the thermoplastic used and it must not prevent the subsequent adherence of the thermoplastic material to the bag surfaces in question when heat and pressure are applied.

In accordance with a preferred embodiment of this invention, the thermoplastic particles which are used in forming seam 4 are caused to adhere to the desired areas by use of electrostatic charges which are imparted to either the bag 2 or the thermoplastic particles. A suitable charge can be built up on either bag 2 or the thermoplastic particles by exposing bag 2 or the particles to a high potential electrical charge. During this exposure, an electrical charge is imparted on the exposed area of the bag. When the charged area is subsequently exposed to a powdered thermoplastic material, said material adheres to the charged area by electrical attraction.

A preferred means for applying the thermoplastic powder to the charged area of the bag comprises exposing the charged area to a fluidized bed of thermoplastic particles wherein air is the fluid medium utilized.

The thermoplastic particles can likewise be charged by exposure to a high potential electrical charge. These particles can then be dusted onto the desired area of the bag. Due to the fact that the charge is present on the particles, said particles will adhere to the bag. However, due to the fact that the charged particles will indiscriminately adhere to the bag, the bag in question must be properly masked so as to cause the thermoplastic particles to adhere to the proper area.

It is understood by one skilled in the art that by either of the above described methods, the thermoplastic particles are caused to adhere to the bag because a difference in potential exists between the bag and the particle. Accordingly, the particle must be applied to the bag before the imparted charge wears off either the bag or the particle and with suitable distribution to ensure complete fusion sealing of the mouth portion.

Potentials on the order of 30,000 volts are usually sufficient to impart a suitable charge to either the bag or the thermoplastic particles.

Once the powdered thermoplastic particles are applied to the mouth portion 8 of bag 2, heat and pressure are applied to effect the bonding of powdered thermoplastic seam 4 to bag 2 and to cause small portions of the thermoplastic material to migrate into and through the openings of stitched seam 6 and to bond to juxtaposed surfaces of the end portion. The powdered thermoplastic seam 4 may be fused by exposure to a temperature of from about 225° to about 400° F. at a pressure of from about 50 to about 1,000 p.s.i.g. This heat and pressure may be achieved by any convenient means such as an electrical resistance heated platen contacting the temporarily adhered thermoplastic particles. During bonding, the platen may be protected with a non-adherent coating such as Teflon. However, it is to be noted that the process and temperature must be correlated such that the temperature is sufficient to cause the thermoplastic material to reach a softening stage and the pressure is sufficient to permit the softened thermoplastic material to migrate into and through the openings of the stitched seam. If, for example, seams such as overlapping seam 10, are to be secured, sufficient heat and pressure must be applied to cause thermoplastic seam 4 to bond to the overlapping portions of bag 2.

The subject invention can be advantageously utilized in conjunction with cellulosic pulp-thermoplastic tape materials. That is, a powdered thermoplastic material of this invention can be advantageously used as a bonding aid either singularly or in combination with a cellulosic pulp-thermoplastic tape. The use of cellulosic pulp-thermoplastic tape materials for this purpose is described and claimed in detail in a patent application entitled "Bag Sealing Method," which was filed simultaneously with this application and has an assignee which is common with the assignee of this application.

Modifications may be resorted to within the spirit and scope of the appended claims.

What is claimed is:

1. In a process for hermetically sealing an end portion of a bag of flexible material in which the juxtaposed surfaces of the end of said bag are stitched together and heat and pressure are applied to said end of bag, the improvement comprising the step of dusting a powdered thermoplastic material on the stitched end portion of said bag prior to application of said heat and pressure so that powdered thermoplastic material migrates through the apertures in the stitched seam in the juxtaposed surfaces of said bag to hermetically seal the end of said bag.

2. The process as set forth in claim 1 in which the applied heat is in the range of 225 to 400° F. and the applied pressure is in the range of 50 to 150 p.s.i.g.

3. A process as set forth in claim 1 further including the step of imparting an electrostatic charge to said bag prior to dusting the powdered thermoplastic material on said bag so that said powdered thermoplastic material adheres to said bag when dusted thereon.

4. A process as set forth in claim 1 further including the step of imparting an electrostatic charge to said powdered thermoplastic material prior to dusting of the powdered thermoplastic material on said bag so that said powdered thermoplastic material adheres to said bag when dusted thereon.

References Cited

UNITED STATES PATENTS

| 2,488,212 | 11/1949 | Lloyd Jr. | 156—306X |
| 2,920,679 | 1/1960 | Sittel | 156—380X |
| 3,097,618 | 7/1963 | Davis | 161—52X |
| 3,304,221 | 2/1967 | Eggleton | 156—283X |
| 3,419,453 | 12/1968 | Levenson Jr. | 156—583X |

CARL D. QUARFORTH, Primary Examiner

S. HELLMAN, Assistant Examiner

U.S. Cl. X.R.

156—93, 283